United States Patent
Mabey et al.

(10) Patent No.: US 7,457,358 B2
(45) Date of Patent: Nov. 25, 2008

(54) POLYMORPHIC CODEC SYSTEM AND METHOD

(75) Inventors: Danny L. Mabey, Farmington, UT (US); Jodie L. Reynolds, Folsom, CA (US); Lawrence S. Reznick, Sacramento, CA (US); John E. Wilkinson, Carmichael, CA (US); Jack A. Prock, Folsom, CA (US)

(73) Assignee: Interact Devices, Inc., Folsom, CA (US)

( * ) Notice: Subject to any disclaimer, the term of this patent is extended or adjusted under 35 U.S.C. 154(b) by 1073 days.

(21) Appl. No.: 10/784,754

(22) Filed: Feb. 23, 2004

(65) Prior Publication Data

US 2005/0038645 A1 Feb. 17, 2005

Related U.S. Application Data

(63) Continuation-in-part of application No. 10/692,106, filed on Oct. 23, 2003, and a continuation-in-part of application No. 10/256,866, filed on Sep. 26, 2002, now Pat. No. 7,295,608.

(60) Provisional application No. 60/325,483, filed on Sep. 26, 2001.

(51) Int. Cl.
*H04N 7/12* (2006.01)

(52) U.S. Cl. .............. 375/240.01; 375/240; 375/240.12

(58) Field of Classification Search ................ 375/240, 375/240.01, 240.08, 240.1, 240.12, 240.14
See application file for complete search history.

(56) References Cited

U.S. PATENT DOCUMENTS

| 5,481,297 A | 1/1996 | Cash et al. | |
|---|---|---|---|
| 5,517,246 A | 5/1996 | Suzuki | |
| 5,539,908 A | 7/1996 | Chen et al. | 395/700 |
| 5,596,659 A | 1/1997 | Normile et al. | |
| 5,649,030 A | 7/1997 | Normile et al. | |
| 5,684,714 A | 11/1997 | Yogeshwar et al. | |
| 5,822,465 A | 10/1998 | Normile et al. | |

(Continued)

FOREIGN PATENT DOCUMENTS

EP 0889471 B1 6/2004

(Continued)

OTHER PUBLICATIONS

Ostman, Charles; Sentience on Demand, as an Online Commodity;1997, 1998; www.biota.org/ostman/sent1.htm;pp. 1-11.

*Primary Examiner*—Allen Wong
(74) *Attorney, Agent, or Firm*—Kory D. Christensen; Stoel Rives LLP

(57) ABSTRACT

An input module obtains a media signal to be communicated to a destination system, after which an identification module identifies a plurality of scenes within the media signal. A codec includes a selection module that automatically selects different compression methods to respectively compress at least two of the scenes. The compression methods are automatically selected to produce a highest compression quality for the respective scenes according to a set of criteria without exceeding a target data rate. A compression module within the codec then compresses the scenes using the automatically-selected compression methods, after which an output module delivers the compressed scenes to the destination system with an indication of which compression method was used to compress each scene.

56 Claims, 10 Drawing Sheets

U.S. PATENT DOCUMENTS

| | | | |
|---|---|---|---|
| 6,002,720 A | 12/1999 | Yurt et al. | |
| 6,031,939 A | 2/2000 | Gilbert et al. | |
| 6,085,236 A | 7/2000 | Lea | 709/220 |
| 6,115,755 A | 9/2000 | Krishan | 709/250 |
| 6,157,965 A | 12/2000 | Mohammed et al. | 710/8 |
| 6,195,692 B1 | 2/2001 | Hsu | 709/219 |
| 6,212,302 B1 | 4/2001 | Honsinger et al. | |
| 6,243,676 B1 | 6/2001 | Witteman | 704/243 |
| 6,252,544 B1 | 6/2001 | Hoffberg | 342/357.1 |
| 6,349,151 B1 | 2/2002 | Jones et al. | |
| 6,356,545 B1 | 3/2002 | Vargo et al. | |
| 6,356,589 B1 * | 3/2002 | Gebler et al. | 375/240.1 |
| 6,356,668 B1 | 3/2002 | Honsinger et al. | |
| 6,421,726 B1 | 7/2002 | Kenner et al. | 709/225 |
| 6,587,638 B1 | 7/2003 | Watanabe et al. | |
| 6,624,761 B2 | 9/2003 | Fallon | 341/51 |
| 6,754,181 B1 | 6/2004 | Elliott et al. | |
| 6,968,006 B1 * | 11/2005 | Puri et al. | 375/240.08 |
| 7,130,472 B2 | 10/2006 | Iizuka et al. | |
| 2002/0062482 A1 | 5/2002 | Bolle et al. | |
| 2002/0097917 A1 | 7/2002 | Nelson et al. | |
| 2003/0133501 A1 | 7/2003 | Ueda et al. | |

FOREIGN PATENT DOCUMENTS

| | | |
|---|---|---|
| WO | 9918728 A1 | 4/1999 |
| WO | 02087255 A1 | 10/2002 |

* cited by examiner

POLYMORPHIC CODEC SYSTEM AND METHOD

CROSS-REFERENCE TO RELATED APPLICATIONS

This application is a continuation-in-part of U.S. patent application Ser. No. 10/256,866, filed Sep. 26, 2002, now U.S. Pat. No. 7,295,608, which claims the benefit of Provisional Application No. 60/325,483, filed Sep. 26, 2001, both of which are incorporated herein by reference. This application is also a continuation-in-part of U.S. patent application Ser. No. 10/692,106, filed Oct. 23, 2003, which is likewise incorporated herein by reference.

TECHNICAL FIELD

The present invention relates generally to the field of data compression. More specifically, the present invention relates to techniques for optimizing data compression for video communication.

BACKGROUND OF THE INVENTION

Conventionally, a codec uses a single type of algorithm to compress videos signals. For example, many codecs, such as MPEG, use discrete cosine transfer (DCT) algorithms, while others use fractal or wavelet algorithms. In some cases, a user may be able to select a particular codec, but once the choice is made, the selected codec is used throughout a communication session.

Certain algorithms result in better compression and/or transmission quality than others for media signals having particular characteristics. Unfortunately, the characteristics of a given media signal may vary substantially during a transmission. Thus, using a single codec to compress a media signal will often produce less than optimal results.

No existing system currently allows a single codec to use multiple compression algorithms, such as DCT, fractal, wavelet, or other algorithms, within the same transmission.

DETAILED DESCRIPTION

Figure 1:
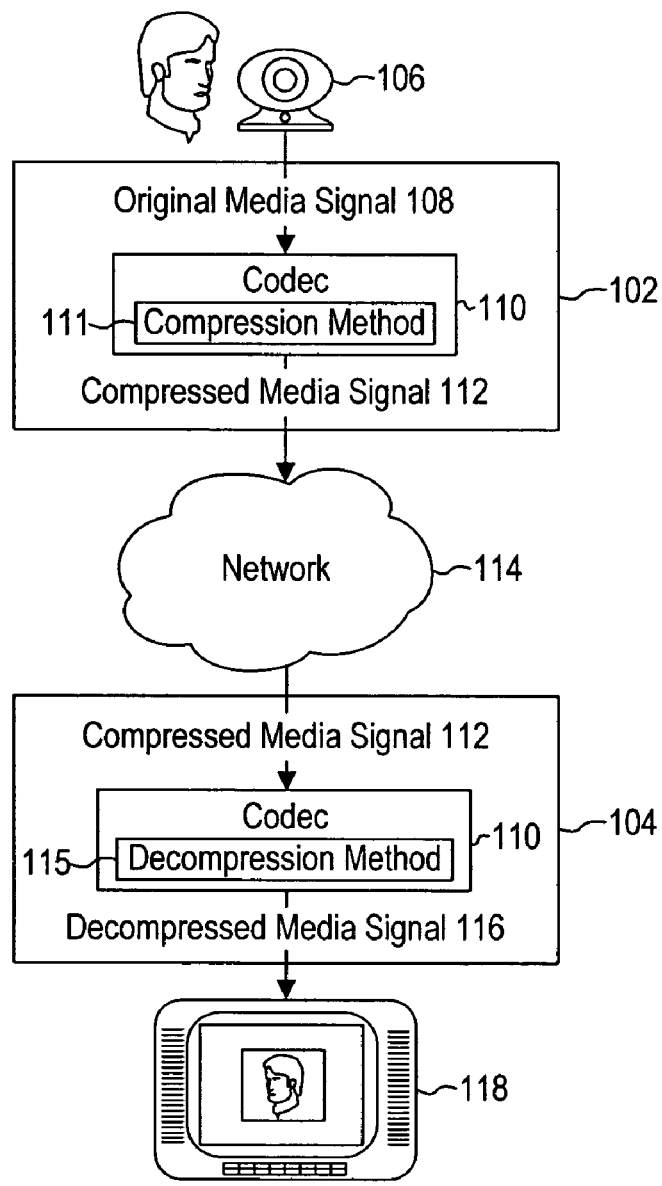
FIG. 1 is a block diagram of a conventional communication system using a codec for data compression.

Reference is now made to the figures in which like reference numerals refer to like or similar elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 is a block diagram of a conventional system 100 for communicating media signals, such as audio and video signals, from a source system 102 to a destination system 104. The source and destination systems 102, 104 may be variously embodied, for example, as personal computers (PCs), cable or satellite set-top boxes (STBs), dedicated video conferencing systems, or video-enabled portable devices, such as personal digital assistants (PDAs) or cellular telephones.

Within the source system 102, a video camera 106 or other device captures an original media signal 108. A codec (compressor/decompressor) 110 processes the original media signal 108 using a particular compression method (algorithm) 111 to create a compressed media signal 112. General classifications of compression methods 111 include discrete cosine transform (DCT) methods, fractal methods, and wavelet methods. Those of skill in the art, however, will recognize that a wide variety of compression methods may be used.

The compressed media signal 112 may be delivered to the destination system 104 via a network 114, such as a local area network (LAN) or the Internet. Alternatively, the compressed media signal 112 may be written to a storage medium, such as a CD, DVD, flash memory device, or the like.

At the destination system 104, the same or a similar codec 110 processes the compressed media signal 112 method received through the network 114 using a corresponding decompression method 115 to generate a decompressed media signal 116. The destination system 104 then presents the decompressed media signal 116 on a display device 118, such as a television, computer monitor, or the like.

Conventionally, the codec 110 uses a single compression method 111 to process the entire media signal 108 during a communication session or for a particular storage medium. However, as noted above, a media signal is not a static quantity. Video signals may change substantially from scene to scene. A single compression method 111, which may function well under certain conditions, may not fare so well under different conditions. Changes in available bandwidth, line conditions, or characteristics of the media signal, itself, may drastically change the compression quality to the point that a different compression method 111 may do much better.

In certain cases, a video engineer may be able to manually specify a change of codec 110 within a media signal 108 where, for instance, the content developer knows that one codec 110 may be superior to another codec 110. However, this requires significant human effort and cannot be performed in real time.

Figure 2:
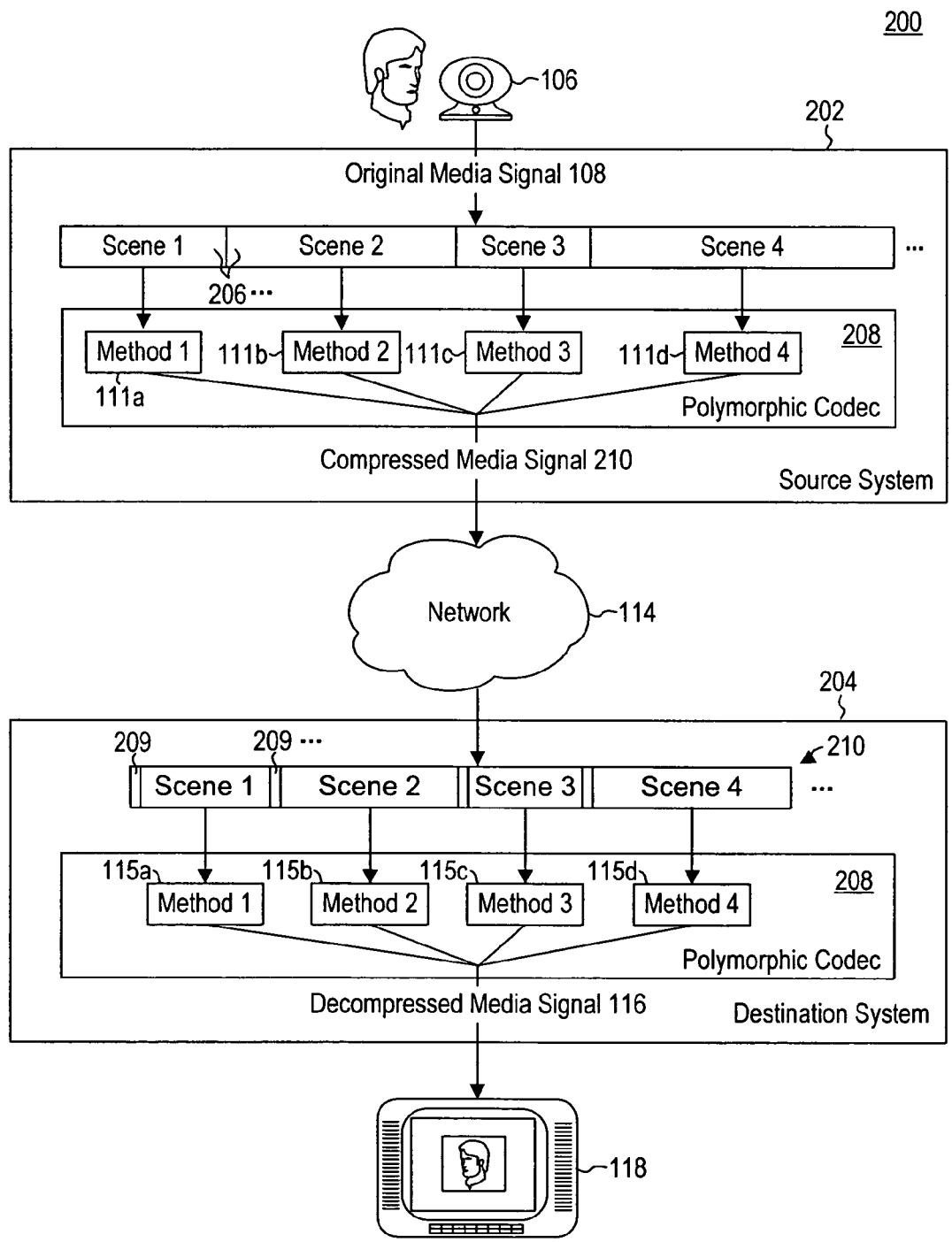
FIG. 2 is a block diagram of a communication system using a polymorphic codec according to an embodiment of the invention.

FIG. 2 is a block diagram of a system 200 for communicating media signals from a source system 202 to a destination system 204 according to an embodiment of the present invention. As before, the source system 202 receives an original media signal 108 captured by a video camera 106 or other suitable device.

However, unlike the system 100 of FIG. 1, the depicted system 200 is not limited to using a codec 110 with a single compression method 111. Rather, each scene 206 or segment of the original media signal 108 may be compressed using one of a plurality of compression methods 111 of a polymorphic codec 208. As explained below, the polymorphic codec 208 is capable of changing its form during a communication session to use potentially different compression methods 111 for each scene 206.

A scene 206 may include one or more "frames" of the original media signal 108. A frame is generally defined as a single image in a sequence of images. As used herein, a scene 206 may correspond to a fixed segment of the media signal 108, e.g., two seconds of video or a fixed number of frames. In other embodiments, a scene 206 may be defined by characteristics of the original media signal 108, i.e., a scene 206 may include two or more frames sharing similar characteristics.

As illustrated, four scenes 206 within the same media signal 108 may be compressed using four automatically-selected compression methods 111a-d. The compression methods 111a-d may be of various types known to those of skill in the art, e.g., DCT, fractal, wavelet, and the like.

Unlike conventional systems 100, the system 200 of FIG. 2 automatically selects, from the available compression methods 111, a particular method 111 best suited to compressing each scene 206. Details of the selection process are described in greater detail below. Briefly, however, the system 200 records which compression methods 111 are used for scenes 206 having particular characteristics. If a subsequent scene 206 is determined to have the same characteristics, the same compression method 111 is used. However, if a scene 206 is found to have substantially different characteristics from those previously observed, the system 200 tests various compression methods 111 on the scene 206 and selects the method 111 producing the highest compression quality (i.e., how similar the compressed media signal 210 is to the original signal 108 after decompression) for a particular target data rate.

In addition, the source system 202 reports to the destination system 204 which compression method 111 was used to compress each scene 206. As illustrated, this may be accomplished by associating method identifiers 209 with each scene 206 in the resulting compressed media signal 210. The method identifiers 209 may precede each scene 206, as shown, or could be sent as a block at some point during the transmission. The precise format of the method identifiers 209 is not crucial to the invention and may be implemented using standard data structures known to those of skill in the art.

The destination system 204 uses the method identifiers 209 to select the corresponding decompression methods 115 for decompressing the respective scenes 206. The resulting decompressed media signal 116 may then be presented on the display device 118, as previously described.

Figure 3:
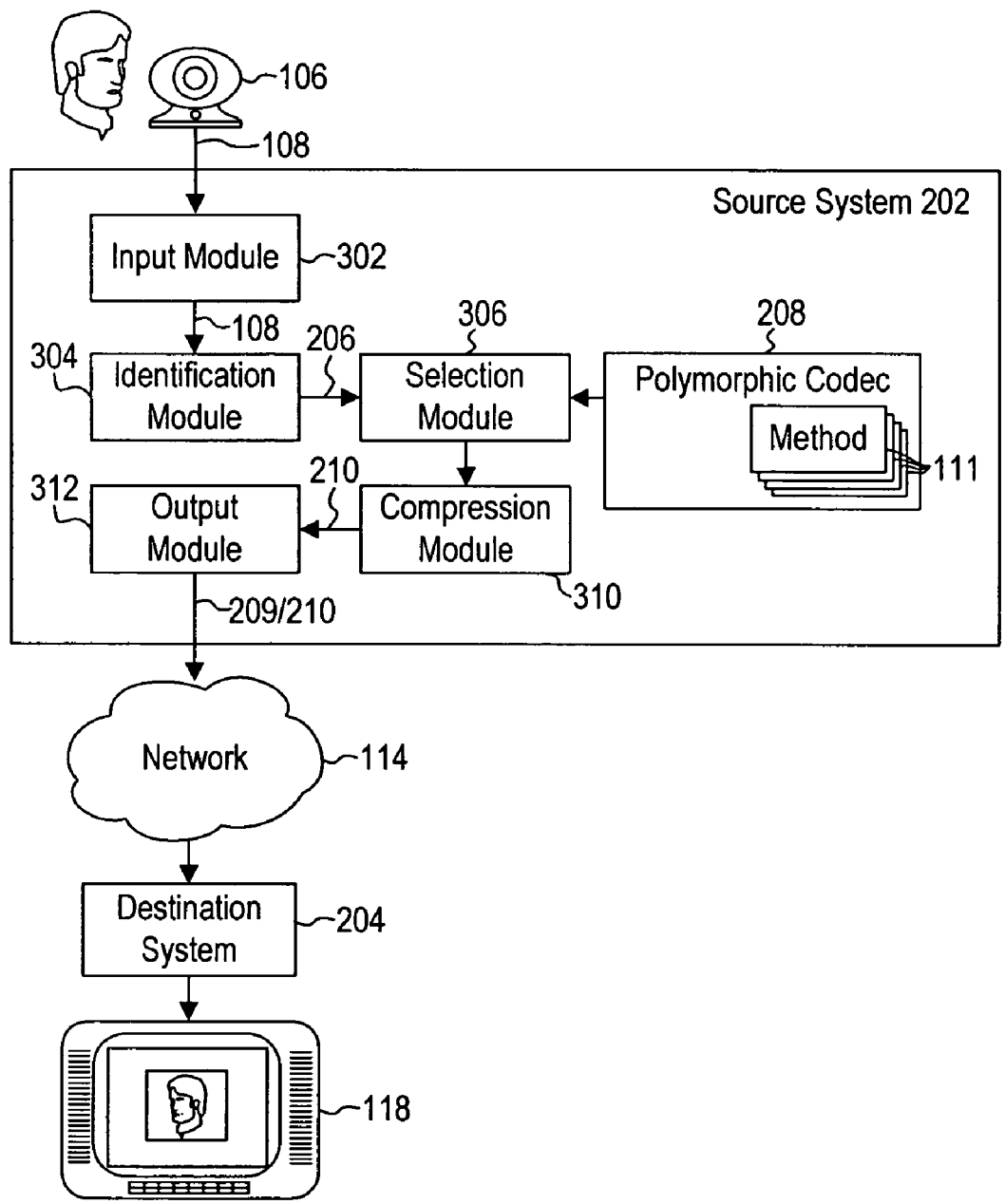
FIG. 3 is a detailed block diagram of a source system according to a first embodiment of the invention.

FIG. 3 illustrates additional details related to the source system 202. In one embodiment, an input module 302 receives the original media signal 108 from the video camera 106 or other source device. An identification module 304 divides the original media signal 108 into scenes 206 and identifies various characteristics of each scene 206, as described in greater detail below.

Thereafter, for each scene 206, a selection module 306 selects the optimal compression method 111 for the scene 206 based on the characteristics or through a process of testing various compression methods 111. As used herein, "optimal" means producing the highest compression quality for the compressed media signal 210 at a particular target data rate among the available compression methods 111 for the polymorphic codec 208.

In one embodiment, a user may specify a particular target data rate, i.e., 128 kilobits per second (kbps), which may be selected, for instance, from a menu or the like. Alternatively, the target data rate may be automatically determined from the type of network 114, the type of destination system 204, etc.

The polymorphic codec 208 may provide a wide variety of compression methods 111. Examples of possible compression methods 111 for video are provided in Table 1. Additionally, various audio codecs may be provided, such as MPEG Audio Layer 3 (MP3), MPEG-4 Structured Audio (MP4-SA), CCITT u-Law, Ogg Vorbis, and AC3. Of course, other presently-available or yet-to-be-developed compression methods 111 may be used within the scope of the invention.

TABLE 1

| FOURCC | Name | Owner |
|---|---|---|
| 3IV1 | 3ivx | 3IVX |
| 3IV2 | 3ivx | 3IVX |
| AASC | Autodesk Animator codec | Autodesk |
| ADV1 | WaveCodec | Loronix |
| ADVJ | Avid M-JPEG | Avid Technology |
| AEMI | Array VideoONE MPEG1-I Capture | Array Microsystems |
| AFLI | Autodesk Animator codec | Autodesk |
| AFLC | Autodesk Animator codec | Autodesk |
| AMPG | Array VideoONE MPEG | Array Microsystems |
| ANIM | RDX | Intel |
| AP41 | AngelPotion Definitive | AngelPotion |
| ASV1 | Asus Video | Asus |
| ASV2 | Asus Video (2) | Asus |
| ASVX | Asus Video 2.0 | Asus |
| AUR2 | Aura 2 Codec - YUV 422 | Auravision |
| AURA | Aura 1 Codec - YUV 411 | Auravision |
| AVRn | Avid M-JPEG | Avid Technology |
| BINK | Bink Video | RAD Game Tools |
| BT20 | Prosumer Video | Conexant |
| BTCV | Composite Video Codec | Conexant |
| BW10 | Broadway MPEG Capture/Compression | Data Translation |
| CC12 | YUV12 Codec | Intel |
| CDVC | Canopus DV Codec | Canopus |
| CFCC | DPS Perception | Digital Processing Systems |
| CGDI | Camcorder Video | Microsoft |
| CHAM | Caviara Champagne | Winnov |
| CMYK | Uncompressed CMYK | Colorgraph |
| CJPG | WebCam JPEG | Creative Labs |
| CPLA | YUV 4:2:0 | Weitek |
| CRAM | Microsoft Video 1 | Microsoft |
| CVID | Cinepak | Providenza & Boekelheide |
| CWLT | Color WLT DIB | Microsoft |
| CYUV | Creative YUV | Creative Labs |
| CYUY | | ATI Technologies |
| D261 | H.261 | DEC |
| D263 | H.263 | DEC |
| DIV3 | DivX MPEG-4 | DivX |
| DTV4 | DivX MPEG-4 | DivX |
| DIV5 | DivX MPEG-4 | DivX |
| DIVX | DivX | OpenDivX |
| divx | DivX | |
| DMB1 | Rainbow Runner hardware compression | Matrox |
| DMB2 | Rainbow Runner hardware compression | Matrox |

TABLE 1-continued

| FOURCC | Name | Owner |
|---|---|---|
| DSVD | DV Codec | |
| DUCK | TrueMotion S | Duck Corporation |
| dv25 | DVCPRO | Matrox |
| dv50 | DVCPRO50 | Matrox |
| dvsd | | Pinnacle Systems |
| DVE2 | DVE-2 Videoconferencing Codec | InSoft |
| DVX1 | DVX1000SP Video Decoder | Lucent |
| DVX2 | DVX2000S Video Decoder | Lucent |
| DVX3 | DVX3000S Video Decoder | Lucent |
| DX50 | DivX MPEG-4 version 5 | DivX |
| DXTn | DirectX Compressed Texture | Microsoft |
| DXTC | DirectX Texture Compression | Microsoft |
| ELK0 | Elsa Quick Codec | Elsa |
| EKQ0 | Elsa Quick Codec | Elsa |
| ESCP | Escape | Eidos Technologies |
| ETV1 | eTreppid Video Codec | eTreppid Technologies |
| ETV2 | eTreppid Video Codec | eTreppid Technologies |
| ETVC | eTreppid Video Codec | eTreppid Technologies |
| FLJP | Field Encoded Motion JPEG | D-Vision |
| FRWA | Forward Motion JPEG with alpha channel | SoftLab-Nsk |
| FRWD | Forward Motion JPEG | SoftLab-Nsk |
| FVF1 | Fractal Video Frame | Iterated Systems |
| GLZW | Motion LZW | gabest@freemail.hu |
| GPEG | Motion JPEG | gabest@freemail.hu |
| GWLT | Greyscale WLT DIB | Microsoft |
| H260 through H269 | ITU H.26n | Intel |
| HFYU | Huffman Lossless Codec | |
| HMCR | Rendition Motion Compensation Format | Rendition |
| HMRR | Rendition Motion Compensation Format | Rendition |
| i263 | ITU H.263 | Intel |
| IAN | Indeo 4 Codec | Intel |
| ICLB | CellB Videoconferencing Codec | InSoft |
| IGOR | Power DVD | |
| IJPG | Intergraph JPEG | Intergraph |
| ILVC | Layered Video | Intel |
| ILVR | ITU H.263+ Codec | |
| IPDV | Giga AVI DV Codec | I-O Data Device, Inc. |
| IR21 | Indeo 2.1 | Intel |
| IRAW | Intel Uncompressed UYUV | Intel |
| IV30 through IV39 | Indeo 3 | Ligos |
| IV32 | Indeo 3.2 | Ligos |
| IV40 through IV49 | Indeo Interactive | Ligos |
| IV50 | Indeo Interactive | Ligos |
| JBYR | | Kensington |
| JPEG | JPEG Still Image | Microsoft |
| JPGL | JPEG Light | |
| L261 | Lead H.26 | Lead Technologies |
| L263 | Lead H.263 | Lead Technologies |
| LCMW | Motion CMW Codec | Lead Technologies |
| LEAD | LEAD Video Codec | Lead Technologies |
| LGRY | Grayscale Image | Lead Technologies |
| Ljpg | LEAD MJPEG Codec | Lead Technologies |
| LZO1 | Lempel-Ziv-Oberhumer Codec | Markus Oberhumer |
| M263 | H.263 | Microsoft |
| M261 | H.261 | Microsoft |
| M4S2 | MPEG-4 (automatic WMP download) | Microsoft |
| MC12 | Motion Compensation Format | ATI Technologies |
| MCAM | Motion Compensation Format | ATI Technologies |
| MJ2C | Motion JPEG 2000 | Morgan Multimedia |
| mJPG | Motion JPEG including Huffman Tables | IBM |
| MJPG | Motion JPEG | |
| MMES | MPEG-2 ES | Matrox |
| MP2A | Eval download | Media Excel |
| MP2T | Eval download | Media Excel |
| MP2V | Eval download | Media Excel |
| MP42 | MPEG-4 (automatic WMP download) | Microsoft |
| MP43 | MPEG-4 (automatic WMP download) | Microsoft |
| MP4A | Eval download | Media Excel |
| MP4S | MPEG-4 (automatic WMP download) | Microsoft |
| MP4T | Eval download | Media Excel |
| MP4V | Eval download | Media Excel |
| MPEG | MPEG | MPEG |
| MPG4 | MPEG-4 (automatic WMP download) | Microsoft |
| MPG4 | MPEG-4 | Microsoft |
| MPGI | MPEG | Sigma Designs |
| MRCA | Mrcodec | FAST Multimedia |
| MRLE | Microsoft RLE | Microsoft |
| MSVC | Microsoft Video 1 | Microsoft |
| MSZH | AVImszh | Kenji Oshima |
| MTX1 through MTX9 | | Matrox |
| MV12 | | |
| MWV1 | Aware Motion Wavelets | Aware Inc. |
| nAVI | | |
| NTN1 | Video Compression 1 | Nogatech |
| NVDS | NVidia Texture Format | NVidia |
| NVHS | NVidia Texture Format | NVidia |
| NHVU | NVidia Texture Format | NVidia |
| NVS0–NVS5 | | NVidia |
| NVT0–NVT5 | | NVidia |
| PDVC | DVC codec | I-O Data Device, Inc. |
| PGVV | Radius Video Vision | Radius |

TABLE 1-continued

| FOURCC | Name | Owner |
|---|---|---|
| PHMO | Photomotion | IBM |
| PIM1 | | Pegasus Imaging |
| PIM2 | | Pegasus Imaging |
| PIMJ | Lossless JPEG | Pegasus Imaging |
| PIXL | Video XL | Pinnacle Systems |
| PVEZ | PowerEZ | Horizons Technology |
| PVMM | PacketVideo Corporation MPEG-4 | PacketVideo Corporation |
| PVW2 | Pegasus Wavelet Compression | Pegasus Imaging |
| qpeq | QPEG 1.1 | Q-Team |
| QPEG | QPEG | Q-Team |
| raw | Raw RGB | |
| RGBT | 32 bit support | Computer Concepts |
| RLE | Run Length Encoder | Microsoft |
| RLE4 | 4 bpp Run Length Encoder | Microsoft |
| RLE8 | 8 bpp Run Length Encoder | Microsoft |
| RMP4 | MPEG-4 AS Profile Codec | Sigma Designs |
| RT21 | Real Time Video 2.1 | Intel |
| rv20 | RealVideo G2 | Real |
| rv30 | RealVideo 8 | Real |
| RVX | RDX | Intel |
| s422 | VideoCap C210 YUV Codec | Tekram International |
| SAN3 | DivX 3 | |
| SDCC | Digital Camera Codec | Sun Communications |
| SEDG | Samsung MPEG-4 | Samsung |
| SFMC | Surface Fitting Method | CrystalNet |
| SMSC | Proprietary codec | Radius |
| SMSD | Proprietary codec | Radius |
| smsv | Wavelet Video | WorldConnect (corporate site) |
| SP54 | | SunPlus |
| SPIG | Spigot | Radius |
| SQZ2 | VXTreme Video Codec V2 | Microsoft |
| SV10 | Video R1 | Sorenson Media |
| STVA | ST CMOS Imager Data | ST Microelectronics |
| STVB | ST CMOS Imager Data | ST Microelectronics |
| STVC | ST CMOS Imager Data (Bunched) | ST Microelectronics |
| STVX | ST CMOS Imager Data | ST Microelectronics |
| STVY | ST CMOS Imager Data | ST Microelectronics |
| SVQ1 | Sorenson Video | Sorenson Media |
| TLMS | Motion Intraframe Codec | TeraLogic |
| TLST | Motion Intraframe Codec | TeraLogic |
| TM20 | TrueMotion 2.0 | Duck Corporation |
| TM2X | TrueMotion 2X | Duck Corporation |
| TMIC | Motion Intraframe Codec | TeraLogic |
| TMOT | TrueMotion S | Horizons Technology |
| TR20 | TrueMotion RT 2.0 | Duck Corporation |
| TSCC | TechSmith Screen Capture Codec | Techsmith Corp. |
| TV10 | Tecomac Low-Bit Rate Codec | Tecomac, Inc. |
| TVJP | | Pinnacle/Truevision |
| TVMJ | | Pinnacle/Truevision |
| TY2C | Trident Decompression | Trident Microsystems |
| TY2N | | Trident Microsystems |
| TY0N | | Trident Microsystems |
| UCOD | ClearVideo | eMajix.com |
| ULTI | Ultimotion | IBM Corp. |
| V261 | Lucent VX2000S | Lucent |
| V655 | YUV 4:2:2 | Vitec Multimedia |
| VCR1 | ATI Video Codec 1 | ATI Technologies |
| VCR2 | ATI Video Codec 2 | ATI Technologies |
| VCR3–9 | ATI Video Codecs | ATI Technologies |
| VDCT | VideoMaker Pro DIB | Vitec Multimedia |
| VDOM | VDOWave | VDONet |
| VDOW | VDOLive | VDONet |
| VDTZ | VideoTizer YUV Codec | Darim Vision Co. |
| VGPX | VideoGramPix | Alaris |
| VIFP | VFAPI Codec | |
| VIDS | | Vitec Multimedia |
| VIVO | Vivo H.263 | Vivo Software |
| VIXL | Video XL | Pinnacle Systems |
| VLV1 | | VideoLogic |
| VP30 | VP3 | On2 |
| VP31 | VP3 | On2 |
| vssv | VSS Video | Vanguard Software Solutions |
| VX1K | VX1000S Video Codec | Lucent |
| VX2K | VX2000S Video Codec | Lucent |
| VXSP | VX1000SP Video Codec | Lucent |
| VYU9 | ATI YUV | ATI Technologies |
| VYUY | ATI YUV | ATI Technologies |
| WBVC | W9960 | Winbond Electronics |
| WHAM | Microsoft Video 1 | Microsoft |
| WINX | Winnov Software Compression | Winnov |
| WJPG | Winbond JPEG | |
| WNV1 | Winnov Hardware Compression | Winnov |
| x263 | | Xirlink |
| XVID | XVID MPEG-4 | XVID |
| XLV0 | XL Video Decoder | NetXL Inc. |

TABLE 1-continued

| FOURCC | Name | Owner |
| --- | --- | --- |
| XMPG | XING MPEG | XING Corporation |
| XWV0–XWV9 | XiWave Video Codec | XiWave |
| XXAN | | Origin |
| Y411 | YUV 4:1:1 | Microsoft |
| Y41P | Brooktree YUV 4:1:1 | Conexant |
| Y8 | Grayscale video | |
| YC12 | YUV 12 codec | Intel |
| YUV8 | Caviar YUV8 | Winnov |
| YUY2 | Raw, uncompressed YUV 4:2:2 | Microsoft |
| YUYV | | Canopus |
| ZLIB | | |
| ZPEG | Video Zipper | Metheus |
| ZyGo | ZyGo Video | ZyGo Digital |

Referring again to FIG. 3, after a compression method 111 is selected for a scene 206, a compression module 310 compresses the scene 206 using the selected compression method 111 of the polymorphic codec 208. An output module 312 receives the resulting compressed media signal 210 and, in one embodiment, adds method identifiers 209 to indicate which compression method 111 was used to compress each scene 206. In other embodiments, the method identifiers 209 may be added by the compression module 310 or at other points in the compression process. The output module 312 then delivers the compressed media signal 210 (with method identifiers 209) to the destination system 204 via the network 114.

In one embodiment, the input module 302 and the selection module 306 may be components of the polymorphic codec 208. This would allow the polymorphic codec 208 to appear to a video application as a standard codec 110 with a single compression method 111, although multiple compression methods 111 would actually be used. Many video applications support plug-in codecs 110, which would allow an existing application to be upgraded to implement the present invention by adding a plug-in polymorphic codec 208.

Figure 4:
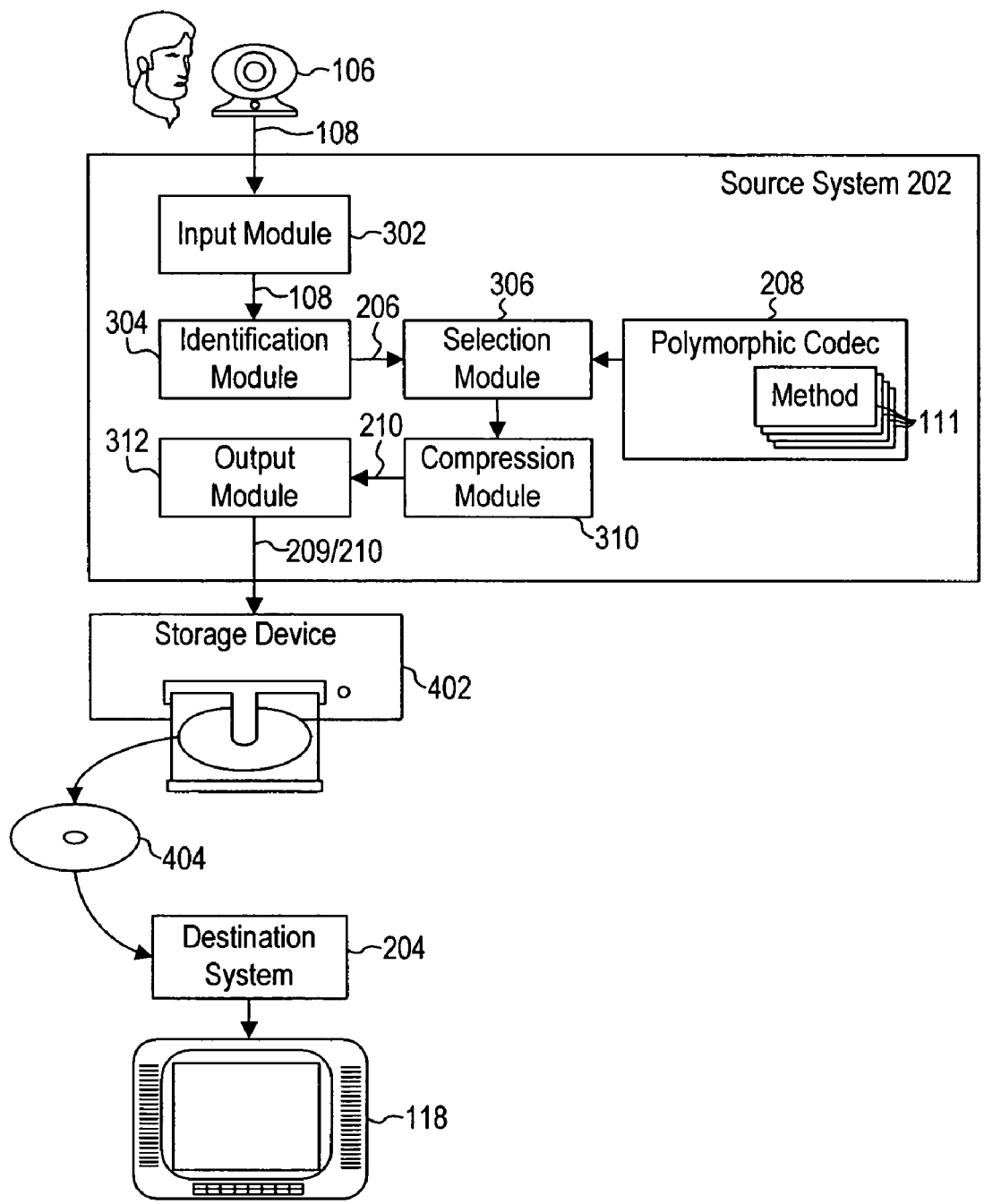
FIG. 4 is a detailed block diagram of a source system according to a second embodiment of the invention.

Those of skill in the art will recognize that the embodiment of FIG. 3 is primarily applicable to streaming media applications, such as video conferencing. In an alternative embodiment, as depicted in FIG. 4, the output module 312 may be coupled to a storage device 402, such as CD or DVD recorder, flash card writer, or the like. As depicted, the compressed media signal 210 (and method identifiers 209) may be stored on an appropriate storage medium 404, which is then physically delivered to the destination system 204. In such an embodiment, the destination system 204 would include a media reader (not shown), such as a DVD-ROM drive, for reading the compressed media signal 210 from the storage medium 404.

Unlike conventional media compression techniques, the original media signal 108 is not compressed using a single codec, such as MPEG-2 for DVDs. Rather, each scene 206 is automatically compressed using the best compression method 111 of a polymorphic codec 208 for that scene 206. Using the above-described technique, between 10 to 12 hours of DVD-quality video may be stored on a single recordable DVD.

Figure 5:
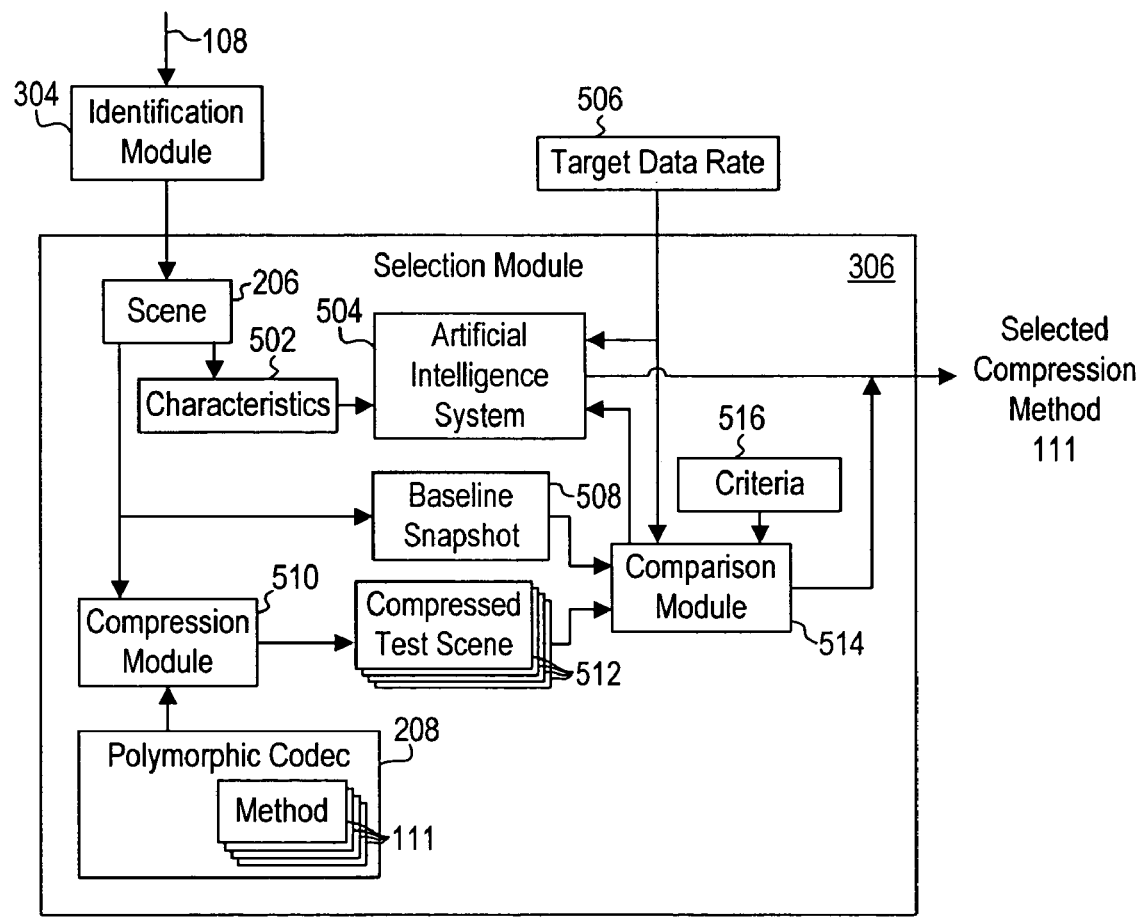
FIG. 5 is a detailed block diagram of a selection module.

FIG. 5 illustrates additional details of the selection module 306. As noted above, the identification module 304 receives the original media signal 108 and identifies individual scenes 206, as well as characteristics 502 of each scene 206. The characteristics 502 may include, for instance, motion characteristics, color characteristics, YUV signal characteristics, color grouping characteristics, color dithering characteristics, color shifting characteristics, lighting characteristics, and contrast characteristics. Those of skill in the art will recognize that a wide variety of other characteristics of a scene 206 may be identified within the scope of the invention.

Motion is composed of vectors resulting from object detection. Relevant motion characteristics may include, for example, the number of objects, the size of the objects, the speed of the objects, and the direction of motion of the objects.

With respect to color, each pixel typically has a range of values for red, green, blue, and intensity. Relevant color characteristics may include how the ranges of values change through the frame set, whether some colors occur more frequently than other colors (selection), whether some color groupings shift within the frame set, whether differences between one grouping and another vary greatly across the frame set (contrast).

In one embodiment, an artificial intelligence (AI) system 504, such as a neural network or expert system, receives the characteristics 502 of the scene 206, as well as a target data rate 506 for the compressed media signal 210. The AI system 504 then determines whether a compression method 111 of the polymorphic codec 208 has previously been found to optimally compress a scene 206 with the given characteristics 502 at the target data rate 506. As explained below, the AI system 504 may be conceptualized as "storing" associations between sets of characteristics 502 and optimal compression methods 111. If an association is found, the selection module 306 outputs the compression method 111 (or an indication thereof) as the "selected" compression method 111.

In some cases, however, a scene 206 having the specified characteristics 502 may not have been previously encountered. Accordingly, the selection module 306 makes a copy of the scene 206, referred to herein as a baseline snapshot 508, which serves as a reference point for determining compression quality.

Thereafter, a compression module 510 tests different compression methods 111 of the polymorphic codec 208 on the scene 206. In one embodiment, the compression module 510 is also the compression module 310 of FIG. 3. As depicted, the compression module 510 compresses the scene 206 using different compression methods 111 at the target data rate 506 to produce multiple compressed test scenes 512.

The compression methods 111 may be tested sequentially, at random, or in other ways, and all of the compression methods 111 need not be tested. In one embodiment, input from the AI system 504 may assist with selecting a subset of the compression methods 111 for testing. In some cases, a time limit may be imposed for testing in order to facilitate real-time compression. Thus, when the time limit is reached, no additional compressed test scenes 512 are generated.

In one embodiment, a comparison module 514 compares the compression quality of each compressed test scene 512 with the baseline snapshot 508 according to a set of criteria 516. The criteria 516 may be based on a comparison of Peak Signal to Noise Ratios (PSNRs), which may be calculated, for an M×N frame, by:

$$\text{PSNR} = 20 \times \log_{10}\left(\frac{255}{\sqrt{\frac{1}{M \times N}\sum_{m=0}^{M-1}\sum_{n=0}^{N-1}[f^1(m,n) - f(m,n)]^2}}\right) \quad \text{Eq. 1}$$

where f is the original frame and f is the uncompressed frame. Alternatively, Root Mean Square Error (RMSE), Signal to Noise Ratio (SNR), or other objective quality metrics may be used as known to those of skill in the art.

In certain embodiments, a Just Noticeable Difference (JND) image quality metric calculation may be used. JND is a robust objective picture quality measurement method known to those skilled in the art. It includes three dimensions for evaluation of dynamic and complex motion sequences—spatial analysis, temporal analysis and full color analysis. By using a model of the human visual system in a picture differencing process, JND produces results that are independent of the compression process and resulting artifacts.

In one embodiment, the comparison module 514 automatically selects the compression method 111 used to generate the compressed scene 512 that has the highest compression quality when compared to the baseline snapshot 508 according to the set of criteria 516. That compression method 111 (or an indication thereof) is then output by the selection module 306 as the selected compression method 111.

The comparison module 514 tells the AI system 504 which compression method 111 was selected for the scene 206. This allows the AI system 504 to make an association between the identified characteristics 502 of the scene 206 and the selected compression method 111. Thus, in the future, the AI system 504 may automatically select the compression method 111 for a similar scene 206 without the need for retesting by the comparison module 514.

Referring also to FIG. 3, in one configuration, the highest-quality compressed test scene 512a is simply passed to the output module 312 (not shown) to be included in the compressed media signal 210. However, the compression module 310 could recompress the scene 206 using the selected compression method 111 in certain embodiments.

In an alternative approach, the AI system 504 shown in FIG. 5 or its equivalent is not used. Rather, the selection module 306 may always test various compression methods 111 on each scene 206 and select the compression method 111 that produces the highest compression quality for a scene 206 without exceeding the target data rate 506. In such an embodiment, the identification module 304 would not need to provide characteristics 502 of a scene 206 to the selection module 306. Moreover, the selection module 306 may simply operate on fixed-sized segments of the media signal 108.

Figure 6:
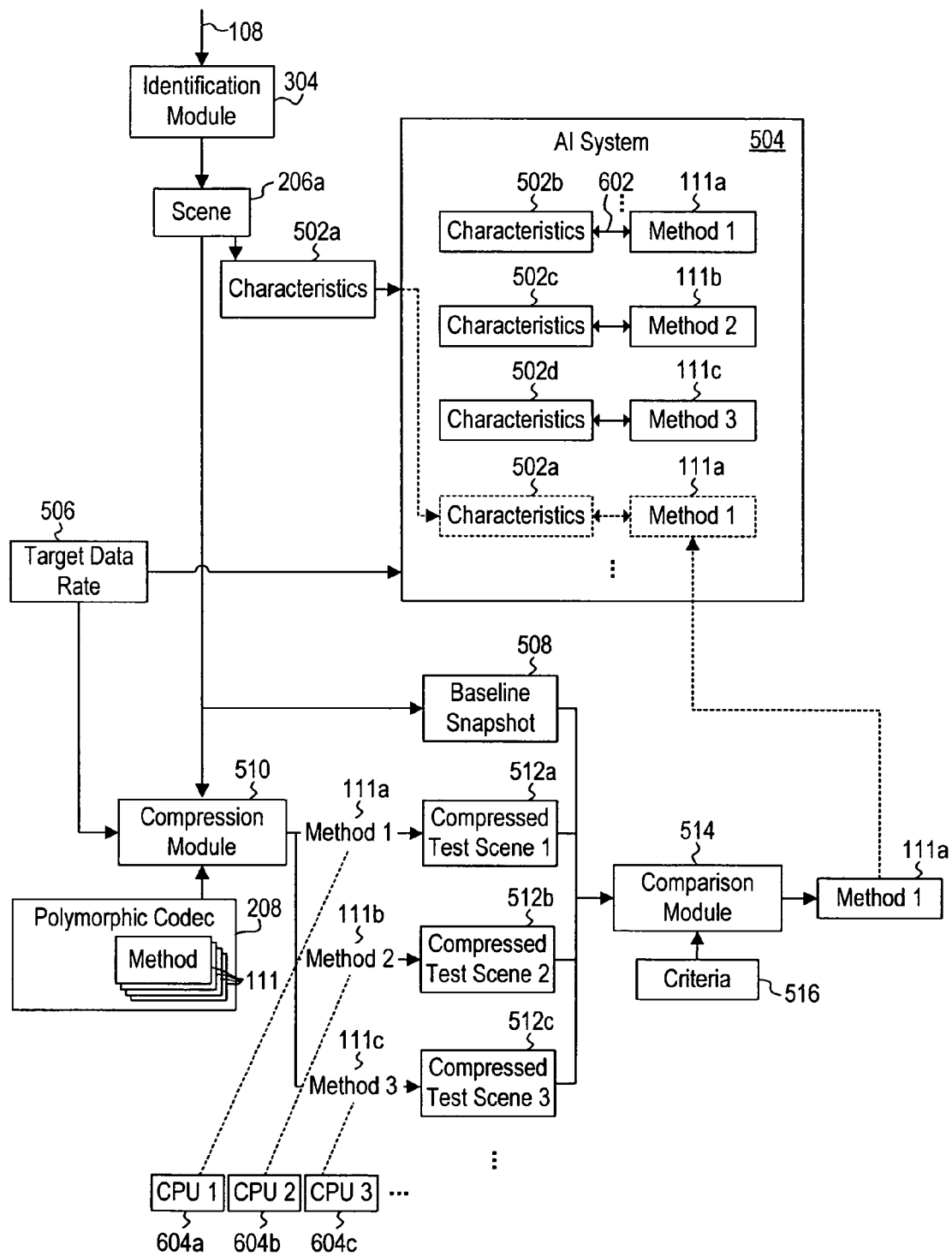
FIG. 6 is a data flow diagram of a process for automatically selecting a compression method within a polymorphic codec.

FIG. 6 provides an example of the above-described processes. Suppose that the identification module 304 finds a scene 206a having a particular set of characteristics 502a. In one embodiment, the AI system 504 searches an association 602 between the characteristics 502a and a particular compression method 111. While the AI system 504 is depicted as including characteristics 502, associations 602, and compression methods 111, those skilled in the art will recognize that these entities may be represented by various codes, hashes, or other identifiers.

Assuming that no such association 602 is found, a baseline snapshot 508 of the scene 206a is taken. In addition, the compression module 510 compresses the scene 206a at the target data rate 506 using a number of different compression methods 111a-c of the polymorphic codec 208 to create a plurality of compressed test scenes 512a-c. These test scenes 512a-c are then compared against the baseline snapshot 508 according to a set of criteria 516, e.g., PSNR.

Suppose that the compressed test scene 512a produced by one compression method 111a ("Codec 1") results in the highest compression quality, e.g., the highest PSNR. In such a case, the comparison module 514 would inform the AI system 504 so that an association 602 could be made between the characteristics 502a of the scene 206a and the selected compression method 111a. Thus, if a scene 206 having the same characteristics 502a is encountered in the future, the AI system 504 could simply identify the optimal compression method 111a without the need for retesting.

As further illustrated in FIG. 6, the compression module 510 may concurrently test multiple compression methods 111 in a multiprocessing environment using multiple computer processors or CPUs (central processing units) 604. For example, the illustrated compression methods 111a-c (or multiple instances of the compression module 510) may execute within separate processing threads of a multiprocessing operating system (OS), such as UNIX®, Windows XP®, or the like. The OS may utilize any number of CPUs 604. In one embodiment, a separate CPU 604a-c is provided for each compression method 111a-c to be tested at the same time. This ensures that an optimal compression method 111 for a scene 206 may be selected in real time.

Figure 7:
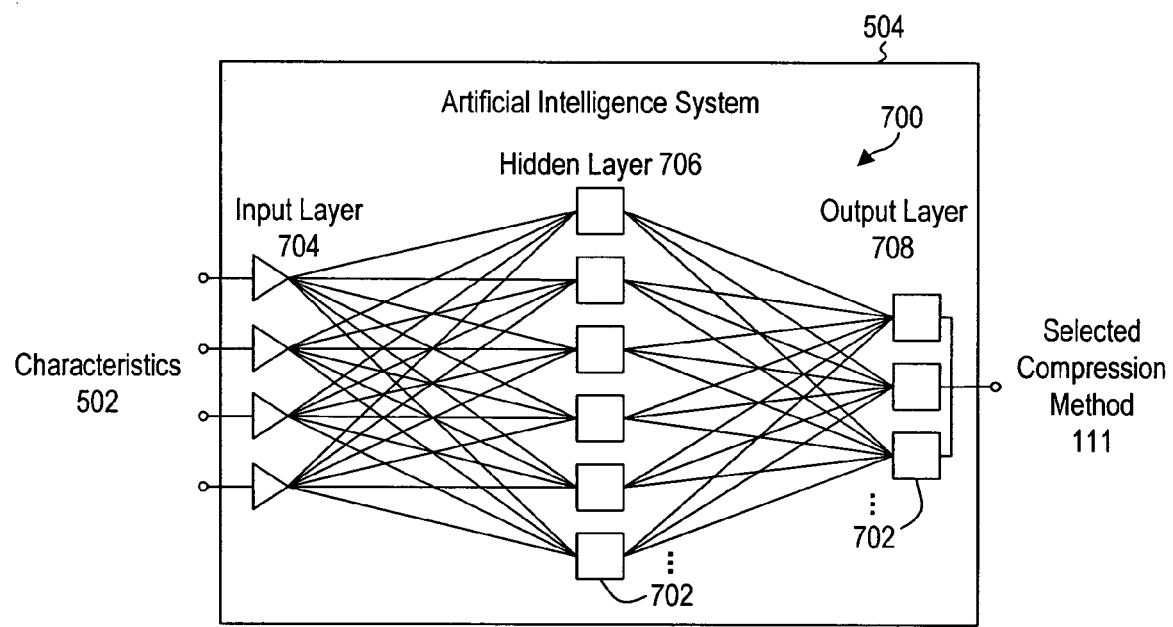
FIG. 7 is a detailed block diagram of an artificial intelligence system for selecting a compression method.

Referring to FIG. 7, the AI system 504 may be implemented using a typical feedforward neural network 700 comprising a plurality of artificial neurons 702. A neuron 702 receives a number of inputs (either from original data, or from the output of other neurons in the neural network 700). Each input comes via a connection that has a strength (or "weight"); these weights correspond to synaptic efficacy in a biological neuron. Each neuron 702 also has a single threshold value. The weighted sum of the inputs is formed, and the threshold subtracted, to compose the "activation" of the neuron 702 (also known as the post-synaptic potential, or PSP, of the neuron 702). The activation signal is passed through an activation function (also known as a transfer function) to produce the output of the neuron 702.

As illustrated, a typical neural network 700 has neurons 702 arranged in a distinct layered topology. The "input" layer 704 is not composed of neurons 702, per se. These units simply serve to introduce the values of the input variables (i.e., the scene characteristics 502). Neurons 702 in the hidden 706 and output 708 layers are each connected to all of the units in the preceding layer.

When the network 700 is executed, the input variable values are placed in the input units, and then the hidden and output layer units are progressively executed. Each of them calculates its activation value by taking the weighted sum of the outputs of the units in the preceding layer, and subtracting the threshold. The activation value is passed through the activation function to produce the output of the neuron 702. When the entire neural network 700 has been executed, the outputs of the output layer 708 act as the output of the entire network 700 (i.e., the selected compression method 111).

While a feedforward neural network 700 is depicted in FIG. 7, those of skill in the art will recognize that other types of neural networks 700 may be used, such as feedback networks, Back-Propagated Delta Rule Networks (BP) and Radial Basis Function Networks (RBF). In other embodiments, an entirely different type of AI system 504 may be used, such as an expert system.

In still other embodiments, the AI system 504 may be replaced by lookup tables, databases, or other data structures that are capable of searching for a compression method 111 based on a specified set of characteristics 502. Thus, the invention should not be construed as requiring an AI system 504.

Figure 8:
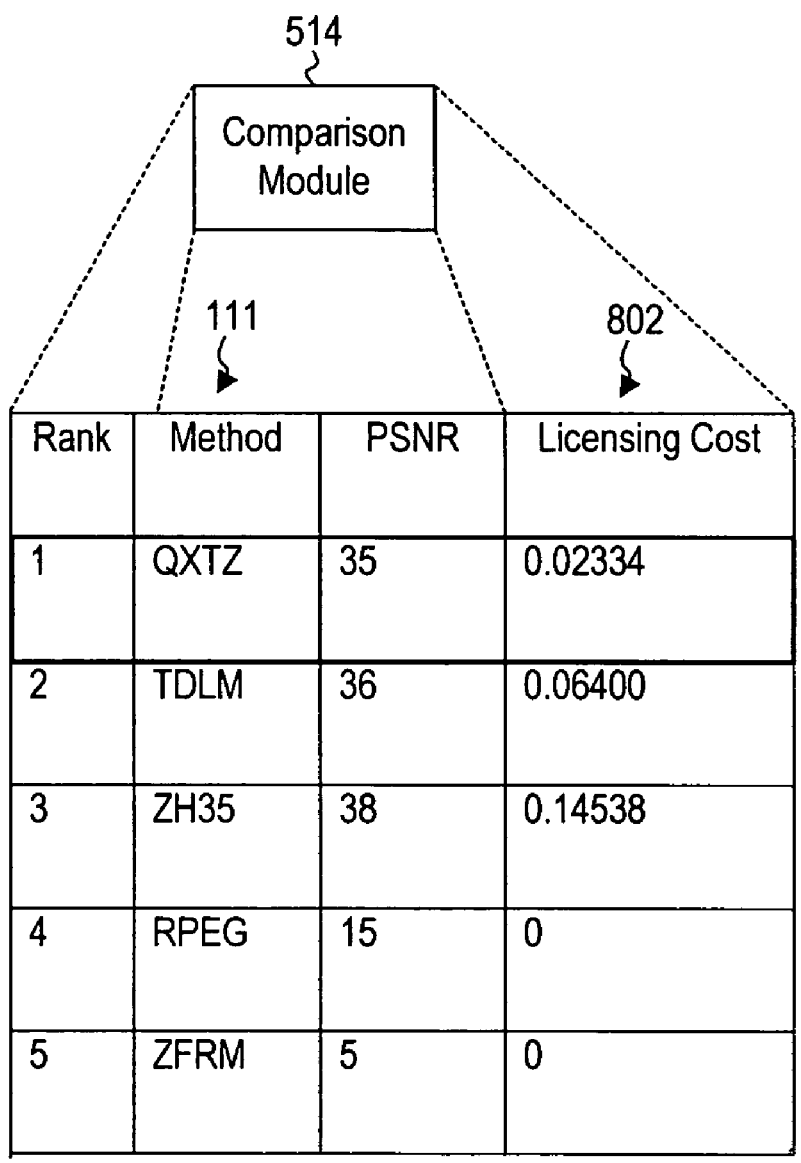
FIG. 8 is a table used by a comparison module to select a compression method based, in part, on licensing cost.
Figure 9:
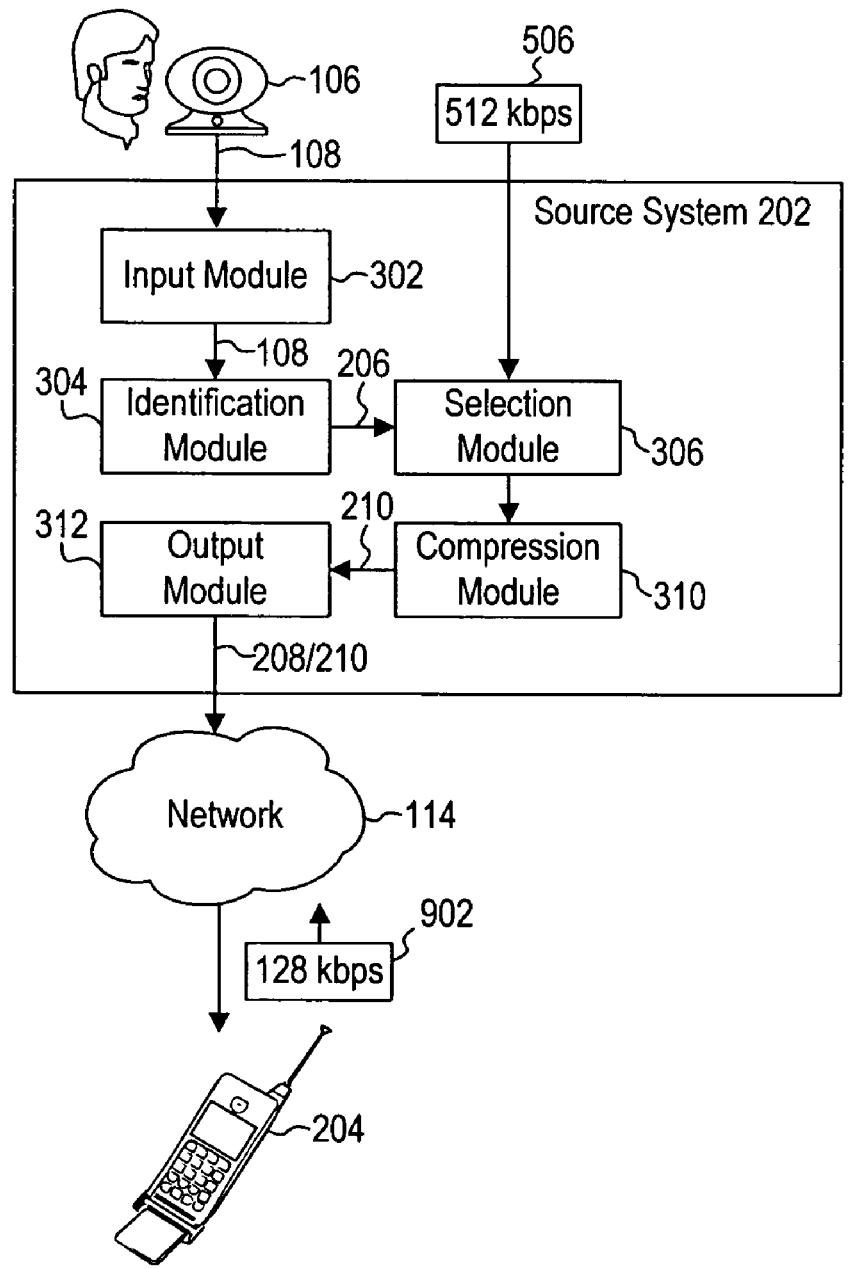
FIG. 9 is a block diagram of source system changing its target data rate.

In one embodiment, as shown in FIG. 8, the comparison module 514 may consider other factors in addition to (or in lieu of) compression quality in determining which compression method 111 to automatically select for a particular scene 206. For instance, the use of certain compression methods 111 may incur licensing costs 802 based on patents or other intellectual property rights. The licensing costs 802 may be tied to the number of times the compression method 111 is used, the amount of data compressed using the compression method 111, or in other ways.

While one compression method 111 may provide an exceptionally high compression quality (e.g., PSNR), its licensing cost 802 may exceed the value of the transmission and would not be cost justified. Indications of the licensing costs 802 for various compression methods 111 may be stored in a table or the like that is accessible to the comparison module 514.

In one embodiment, the licensing costs 802 are considered only when a number of the best compression methods 111 produce similar results, e.g., the compression qualities differ by no more than a threshold amount. In the example of FIG. 8, the first three compression methods 111 produce output of similar quality. However, the compression method 111 with the highest PSNR score is more than two times more expensive than the compression method 111 with the next highest PSNR score, which is, itself, almost three times more expensive than the compression method 111 with the third highest PSNR score. In one configuration, the comparison module 514 would select the compression method 111 with the third highest PSNR score due to its much lower licensing cost 802.

In other embodiments, the comparison module 514 may create a composite score (not shown) based on the PSNR score, the licensing cost 802, and other possible factors. In still other embodiments, the comparison module 514 may calculate an anticipated cost (not shown) for the entire transmission and seek to minimize that cost over all of the codec selection decisions. Hence, the comparison module 514 might select a more expensive compression method 111 for certain scenes 206, where a substantial increase in quality is realized, while selecting less expensive compression methods 111 for other scenes 206.

Figure 10:
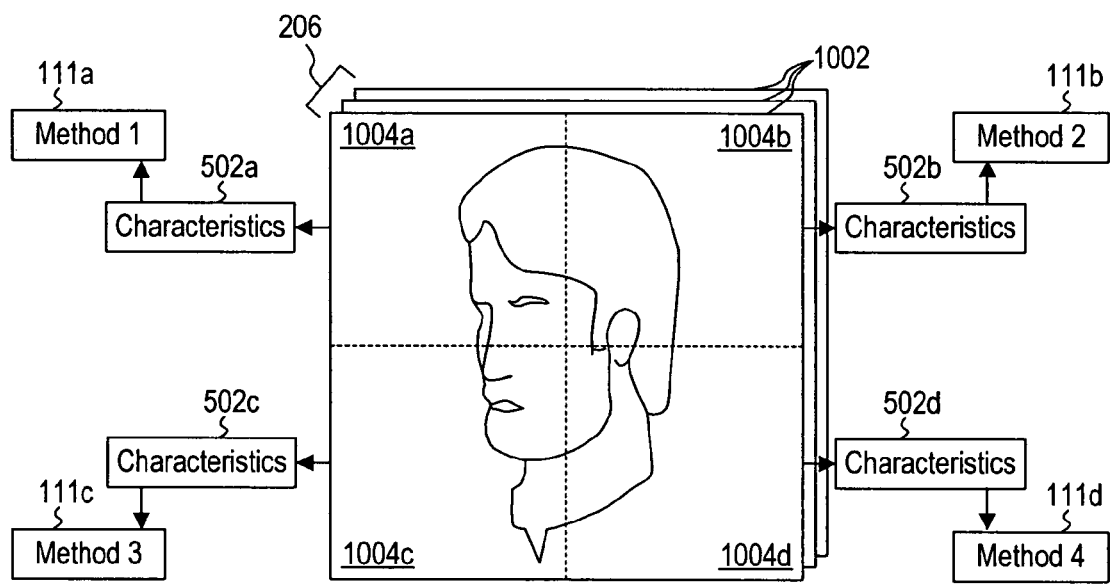
FIG. 10 is a data flow diagram of a process for automatically selecting different compression methods for different sub-frames.

Referring to FIG. 10, a user of the source system 202 may specify a particular target data rate 506, e.g., 512 kbps, for video communication. However, there is no guarantee that the destination system 204 may be able to process data that quickly. Moreover, there is no guarantee that the network 114 will always provide the same amount of bandwidth. As a result, there may be a need to periodically change the target data rate 506 within the selection module 306 of the source system 202, since the target data rate 506 will affect which compression methods 111 are selected for various scenes 206.

For example, the destination system 204 may be embodied as a video-enabled cellular telephone. Typically, the bandwidth over cellular networks 114 is limited. Similarly, the processing power of a cellular telephone is substantially less than that of a personal computer or dedicated video conferencing system.

Thus, although the user of the source system 202 specifies a target data rate 506 of 512 kbps, the destination system 204 and/or network 114 may not be up to the challenge. In one embodiment, in response to receiving a connection request, the destination system 204 provides the source system 202 with a modified target data rate 902, e.g., 128 kpbs. The modified rate 902 may be communicated to the source system 202 using any standard data structure or technique. Thereafter, depending on the configuration, the target data rate 506 may be replaced by the modified rate 902.

In certain embodiments, an actual data rate is not communicated. Rather, a message is sent specifying one or more constraints or capabilities of the destination system 204 or network 114, in which case it would be up to the source system 202 to revise the target data rate 506 as appropriate. A technique of altering the target data rate 506 in response to various conditions is referred to herein as "dynamic streaming."

In one embodiment, dynamic streaming may be employed where no specific message is sent by destination system 204. The source system 202 may use latency calculations, requests to resend lost packets, etc., to dynamically determine the target data rate 506 for purposes of selecting a compression method 111.

Referring to FIG. 10, video frames 1002 within a scene 206 may be subdivided into a plurality of sub-frames 1004. While the depicted video frame 1002 is subdivided into four sub-frames 1004*a-d* of equal size, the invention is not limited in this respect. For instance, a video frame 1002 may be subdivided into any number of sub-frames 1004, although too many sub-frames 1004 may adversely affect compression quality. Moreover, the sub-frames 1004 need not be of equal size. For example, sub-frames 1004 near the center of the video frame 1002 may be smaller due to the relatively greater amount of motion in this area.

In certain embodiments, the sub-frames 1004 may be defined by objects represented within the video frame 1002. As an example, the head of a person could be defined as a separate object and, hence, a different sub-frame 1004 from the background. Algorithms (e.g., MPEG-4) for objectifying a scene within a video frame 1002 are known in the art.

A set of sub-frames 1004*a-d* within a scene 206 exhibit characteristics 502*a-d*, and may be treated, for practical purposes, like a complete video frame 1002. Accordingly, using the techniques described above, the characteristics 502*a-d* may be used to determine an optimal compression method 111*a-d* for the compressing the respective sub-frames 1004*a-d*. For example, an AI system 504 (not shown) may be used to determine whether an association 602 exists between a set of characteristics 502 and a particular compression method 111. If no association 602 exists, compression 510 and comparison 514 modules (not shown) may be used to test a plurality of compression methods 111 on the respective sub-frames 1004 to determine the optimal compression method 111.

Thus, different sub-frames 1004*a-d* of a single scene 206 may be compressed using different compression methods 111*a-d*. In the illustrated embodiment, four different compression methods 111*a-d* are used.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

The invention claimed is:

1. A media compression method comprising:
   obtaining a media signal to be communicated to a destination system;
   identifying a plurality of scenes within the media signal;

compressing the plurality of scenes with a codec supporting multiple compression methods, wherein the codec automatically selects different compression methods to respectively compress at least two of the scenes, wherein the compression methods are automatically selected to produce a highest compression quality for the respective scenes according to a set of criteria without exceeding a target data rate; and delivering the compressed scenes to the destination system with an indication of which compression method was used by the codec to compress each scene.

2. The method of claim 1, wherein the compression methods are selected from the group consisting of discrete cosine transform (DCT), fractal, and wavelet compression methods.

3. The method of claim 1, wherein a first automatically-selected compression method comprises a discrete cosine transform (DCT) method and a second automatically-selected compression method comprises a fractal method.

4. The method of claim 1, wherein a first automatically-selected compression method comprises a discrete cosine transform (DCT) method and a second automatically-selected compression method comprises a wavelet method.

5. The method of claim 1, wherein automatically selecting further comprises:
identifying a plurality of characteristics of a scene; and
searching for a compression method that is associated with the identified characteristics of the scene.

6. The method of claim 5, wherein the characteristics are selected from the group consisting of motion characteristics and color characteristics.

7. The method of claim 6, wherein searching further comprises using an Artificial Intelligence (AI) system to locate a compression method associated with the identified characteristics of a scene.

8. The method of claim 7, wherein the AI system comprises a neural network.

9. The method of claim 7, wherein the AI system comprises an expert system.

10. The method of claim 5, wherein searching further comprises searching for an association between the identified characteristics and a set of parameters to be used with the automatically-selected compression method;
wherein compressing further comprises compressing the scene using the automatically-selected compression method with the associated set of parameters; and
wherein delivering further comprises delivering the compressed scene to the destination system with an indication of which compression method and which set of parameters were used to compress the scene.

11. The method of claim 1, wherein automatically selecting further comprises:
testing at least a subset of the compression methods on a scene; and
automatically selected the compression method that produces a highest compression quality for the scene according to a set of criteria without exceeding the target data rate.

12. The method of claim 11, wherein testing further comprises:
storing a baseline snapshot of the scene; and
for each compression method to be tested:
compressing the scene at or below the target data rate using one of the compression methods in the library;
decompressing the scene using a corresponding decompression method; and
comparing the quality of the decompressed scene with the baseline snapshot according to the set of criteria.

13. The method of claim 12, wherein comparing further comprises comparing the quality according to a Peak Signal to Noise Ratio (PSNR).

14. The method of claim 12, wherein comparing further comprises comparing the quality according to a Just Noticeable Difference (JND) value.

15. The method of claim 12, further comprising:
identifying a plurality of characteristics of a scene; and
associating the identified characteristics of the scene with the automatically-selected compression method.

16. The method of claim 11, wherein testing at least a subset of the compression methods comprises testing a plurality of compressions methods concurrently using a plurality of separate processors.

17. The method of claim 16, wherein the number of processors at least equals the number of compression methods to be tested.

18. The method of claim 11, wherein each compression method is tested within a separate processing thread of a multiprocessing operating system.

19. The method of claim 11, wherein testing further comprises testing compression methods on the scene using different sets of parameters and automatically selecting the compression method and set of parameters that produce a highest compression quality for the scene according to a set of criteria without exceeding the target data rate;
wherein compressing further comprises compressing the scene using the automatically-selected compression method with the automatically-selected parameters; and
wherein delivering further comprises delivering the compressed scene to the destination system with an indication of which compression method and set of parameters were used to compress the scene.

20. The method of claim 19, further comprising:
identifying a plurality of characteristics of a scene; and
associating the automatically-selected compression method and the automatically-selected set of parameters with the identified characteristics of the scene.

21. The method of claim 1, wherein identifying further comprises detecting a scene change in response to one frame of the media signal being sufficiently different from a previous frame.

22. The method of claim 1, wherein identifying further comprises detecting a scene change in response to the passage of a fixed period of time.

23. The method of claim 1, wherein delivering further comprises streaming each compressed scene to the destination system through a network.

24. The method of claim 1, wherein delivering further comprises storing each compressed scene on a storage medium.

25. The method of claim 1, wherein at least one compression method has an associated licensing cost, and wherein selecting further comprises automatically selecting the compression method having the least licensing cost in response to two or more compression methods producing substantially the same quality of compressed output for a scene.

26. A media compression method comprising:
obtaining a media signal to be communicated to a destination system;
automatically selecting different compression methods to respectively compress at least two of the segments of the media signal, wherein the compression methods are automatically selected to produce a highest compression quality for the respective segments without exceeding a target data rate;

compressing the segments using the automatically-selected compression methods; and delivering the compressed segments to the destination system with an indication of which compression method was used to compress each segment.

27. A media compression method comprising:

providing a library of compression methods, at least one compression method having an associated licensing cost;

obtaining a media signal to be communicated to a destination system;

identifying a plurality of scenes within the media signal;

automatically selecting different compression methods from the library to respectively compress at least two of the scenes, wherein the compression methods are automatically selected to produce a highest compression quality at the lowest licensing cost for the respective scenes according to a set of criteria without exceeding a target data rate;

compressing the scenes using the automatically-selected compression methods; and delivering the compressed scenes to the destination system with an indication of which compression method was used to compress each scene.

28. A media compression system comprising:

an input module to obtain a media signal to be communicated to a destination system;

an identification module to identify a plurality of scenes within the media signal;

a codec to automatically select different compression methods to respectively compress at least two of the scenes, wherein the compression methods are automatically selected to produce a highest compression quality for the respective scenes according to a set of criteria without exceeding a target data rate, and wherein the codec is to compress the scenes using the automatically-selected compression methods; and an output module to deliver the compressed scenes to the destination system with an indication of which compression method was used to compress each scene.

29. The system of claim 28, wherein the compression methods are automatically selected from the group consisting of discrete cosine transform (DCT), fractal, and wavelet compression methods.

30. The system of claim 28, wherein a first automatically-selected compression method comprises a discrete cosine transform (DCT) method and a second automatically-selected compression method comprises a fractal method.

31. The system of claim 28, wherein a first automatically-selected compression method comprises a discrete cosine transform (DCT) method and a second automatically-selected compression method comprises a wavelet method.

32. The system of claim 28, wherein the identification module is to identify a plurality of characteristics of a scene; and wherein the codec is to search for a compression method that is associated with the identified characteristics of the scene.

33. The system of claim 32, wherein the characteristics are selected from the group consisting of motion characteristics and color characteristics.

34. The system of claim 33, wherein the codec comprises an Artificial Intelligence (AI) system to locate a compression method associated with the identified characteristics of a scene.

35. The system of claim 34, wherein the AI system comprises a neural network.

36. The system of claim 34, wherein the AI system comprises an expert system.

37. The system of claim 32, wherein the codec is to search for an association between the identified characteristics and a set of parameters to be used with the automatically-selected compression method;

wherein the compression module is to compress the scene using the automatically-selected compression method with the associated set of parameters; and wherein the output module is to deliver the compressed scene to the destination system with an indication of which compression method and which set of parameters were used to compress the scene.

38. The system of claim 28, wherein the codec is to test at least a subset of the compression methods on a scene and automatically select the compression method that produces a highest compression quality for the scene according to a set of criteria without exceeding the target data rate.

39. The system of claim 38, wherein the codec is to store a baseline snapshot of the scene and, for each compression method to be tested, have the scene compressed at or below the target data rate using one of the compression methods in the library, have the scene decompressed using a corresponding decompression method, and compare the quality of the decompressed scene with the baseline snapshot according to the set of criteria.

40. The system of claim 39, wherein the codec is to compare the quality according to a Peak Signal to Noise Ratio (PSNR).

41. The system of claim 39, wherein the codec is to compare the quality according to a Just Noticeable Difference (JND) value.

42. The system of claim 39, wherein the identification module is to identify a plurality of characteristics of a scene; and wherein the codec is to associate the identified characteristics of the scene with the automatically-selected compression method.

43. The system of claim 38, wherein the codec is to test at least a subset of the compression methods concurrently using a plurality of separate processors.

44. The system of claim 43, wherein the number of processors at least equals the number of compression methods to be tested.

45. The system of claim 38, wherein the codec is to test each compression method within a separate processing thread of a multiprocessing operating system.

46. The system of claim 38, wherein the codec is to test the compression methods on the scene using different sets of parameters and automatically select the compression method and set of parameters that produce a highest compression quality for the scene according to a set of criteria without exceeding the target data rate;

wherein the compression module is to compress the scene using the automatically-selected compression method with the automatically-selected parameters; and wherein the output module is to deliver the compressed scene to the destination system with an indication of which compression method and set of parameters were used to compress the scene.

47. The system of claim 46, wherein the identification module is to identify a plurality of characteristics of a scene; and wherein the codec is to associate the automatically-selected compression method and the automatically-selected set of parameters with the identified characteristics of the scene.

48. The system of claim 28, wherein the identification module is to detect a scene change in response to one frame of the media signal being sufficiently different from a previous frame.

49. The system of claim 28, wherein the identification module is to detect a scene change in response to the passage of a fixed period of time.

50. The system of claim 28, wherein the output module is to stream each compressed scene to the destination system through a network.

51. The system of claim 28, wherein the output module is to store each compressed scene on a storage medium.

52. The system of claim 28, wherein at least one compression method has an associated licensing cost, and wherein the codec is to automatically select the compression method having the least licensing cost in response to two or more compression methods producing substantially the same quality of compressed output for a scene.

53. A media compression system comprising:
   an input module to obtain a media signal to be communicated to a destination system;
   a codec to test multiple compression methods on each of a plurality of segments of a media signal, wherein the codec is to automatically select different compression methods to respectively compress at least two segments in order to produce a highest compression quality for the respective segments without exceeding a target data rate, and wherein the codec is to compress the segments using the automatically-selected compression methods; and
   an output module to deliver the compressed segments to the destination system with an indication of which codec was used to compress each segment.

54. The system of claim 53, wherein the codec is to test at least a subset of the compression methods concurrently using a plurality of separate processors.

55. The system of claim 54, wherein the number of processors at least equals the number of compression methods to be tested.

56. The system of claim 53, wherein the codec is to test each compression method within a separate processing thread of a multiprocessing operating system.

* * * * *